(12) United States Patent
Chen

(10) Patent No.: US 12,724,261 B2
(45) Date of Patent: Sep. 1, 2026

(54) OPTICAL FILM, HEAD UP DISPLAY, AND VEHICLE

(71) Applicants: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

(72) Inventor: Yen-Ling Chen, New Taipei (TW)

(73) Assignees: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

( * ) Notice: Subject to any disclaimer, the term of this patent is extended or adjusted under 35 U.S.C. 154(b) by 704 days.

(21) Appl. No.: 17/850,028

(22) Filed: Jun. 27, 2022

(65) Prior Publication Data

US 2023/0305297 A1 Sep. 28, 2023

(30) Foreign Application Priority Data

Mar. 23, 2022 (CN) ......................... 202210289222.4

(51) Int. Cl.
*G02B 27/01* (2006.01)
*B60K 35/00* (2024.01)
(Continued)

(52) U.S. Cl.
CPC .......... *G02B 27/0101* (2013.01); *B60K 35/23* (2024.01); *B60K 35/415* (2024.01);
(Continued)

(58) Field of Classification Search
CPC .... G02B 27/0101; G02B 5/045; B60K 35/00; B60K 35/23; B60K 35/28;
(Continued)

(56) References Cited

U.S. PATENT DOCUMENTS 10,495,879 B1 * 12/2019 Ahuja ............... G02F 1/133606
2004/0043234 A1 * 3/2004 Hay ....................... G02B 5/124
359/489.06

FOREIGN PATENT DOCUMENTS

CN 111948816 A * 11/2020 ......... G02B 27/0101
CN 213338211 U * 6/2021
(Continued)

*Primary Examiner* — William R Alexander
*Assistant Examiner* — Alaina Marie Swanson
(74) *Attorney, Agent, or Firm* — ScienBiziP, P.C.

(57) ABSTRACT

An optical film to proof a head up display (HUD) system against image-contamination by sunlight and against the heat of sunlight is applied in a vehicle. The optical film includes a transparent substrate, a transparent microstructure layer, and a plurality of light blocking layers which allow transmission outwards of image-light for the HUD but prevent the ingress of sunlight. The microstructure layer includes a base portion in direct contact with a surface of the substrate, and a plurality of protrusions protruding from the base portion toward a side away from the substrate. Each light blocking layer is mounted on a protrusion, and each light blocking layer includes an absorbing film that can absorb light or a reflective film that can reflect light, whilst allowing the transmission of outbound light for the image. The HUD using the optical film is not affected by sunlight and has prolonged life.

7 Claims, 6 Drawing Sheets

15

153
1522c
1522b
1522a
1522
152
1521
151

(51) Int. Cl.

| | |
|---|---|
| ***B60K 35/23*** | (2024.01) |
| ***B60K 35/40*** | (2024.01) |
| ***G02B 5/04*** | (2006.01) |
| *B60K 35/28* | (2024.01) |

(52) U.S. Cl.
CPC ............ *B60K 35/425* (2024.01); *G02B 5/045* (2013.01); *B60K 35/28* (2024.01); *B60K 2360/166* (2024.01); *B60K 2360/167* (2024.01); *B60K 2360/23* (2024.01)

(58) Field of Classification Search
CPC ........ B60K 2360/166; B60K 2360/167; B60K 2360/23; B60K 35/415; B60K 35/425; B60K 2360/25
USPC ........................................................... 359/13
See application file for complete search history.

(56) References Cited

FOREIGN PATENT DOCUMENTS

| | | | | | |
|---|---|---|---|---|---|
| JP | 2007116097 | A | * | 5/2007 | ............. C30B 23/04 |
| KR | 20100088546 | A | * | 8/2010 | |
| WO | WO-2010035746 | A1 | * | 4/2010 | ............... G02B 3/06 |
| WO | WO-2017163292 | A1 | * | 9/2017 | ............. B60K 35/00 |

* cited by examiner

15

OPTICAL FILM, HEAD UP DISPLAY, AND VEHICLE

CROSS-REFERENCE TO RELATED APPLICATION

This application claims the priority benefit of China application serial no. 202210289222.4, filed on Mar. 23, 2022. The entirety of the above-mentioned patent application is hereby incorporated by reference herein and made a part of this specification.

FIELD

The subject matter herein generally relates to displays, specifically to an optical film, a preparation method, a head up display (HUD) using the optical film and a vehicle using the HUD.

BACKGROUND

Existing HUD applied to a vehicle cannot be sun-dimmed, furthermore, heat generated by sunlight can cause components in the HUD (such as, a picture generation unit) to heat up and can reduce a service life of the HUD.

Therefore, there is room for improvement in the art.

BRIEF DESCRIPTION OF THE DRAWINGS

Implementations of the present disclosure will now be described, by way of embodiment, with reference to the attached figures.

DETAILED DESCRIPTION

Figure 1:
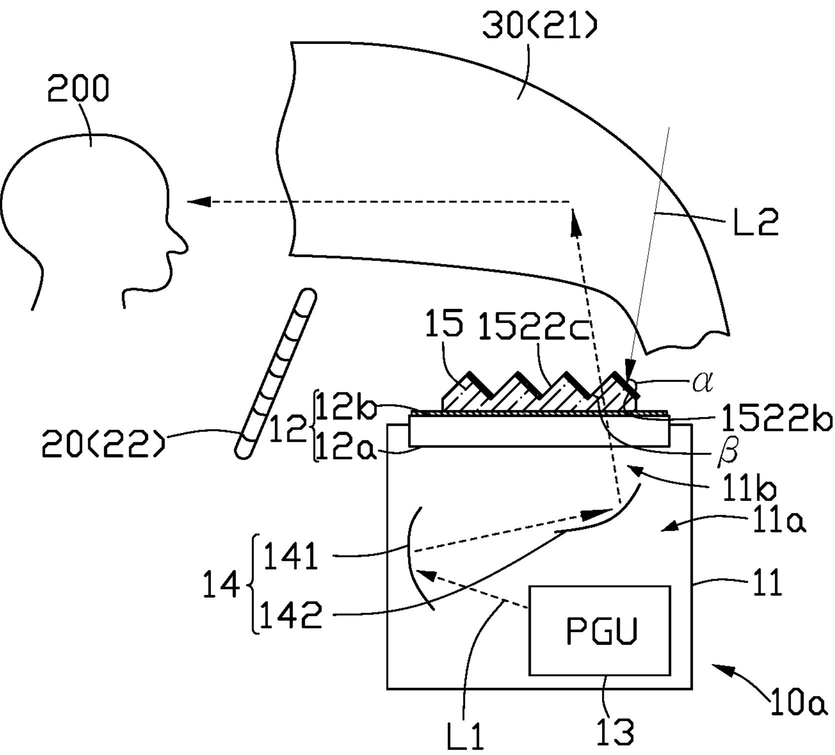
FIG. 1 is a schematic diagram of a vehicle with HUD according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale, and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one".

Head up display (HUD) technology is widely used in automotive, aerospace and marine fields. For example, the HUD can be applied to vehicles such as automobiles, as well as other vehicles such as airplanes, aerospace vehicles, and ships, and the like. A vehicle-mounted HUD is taken as an example for description in the present disclosure. However, it should be understood that it should not be taken as a limitation of the present disclosure.

The HUD uses the principle of optical reflection to project driving-related information (such as driving speed, battery voltage, engine coolant temperature, engine speed, vehicle fuel consumption, navigation route, etc.) on a windshield, which creates a display to assist the driver to drive the vehicle without looking away from the road. Thus, glancing down at the dashboard during driving is not required, the driving safety factor is improved, and a better driving experience is also provided.

As shown in FIG. 1, a vehicle 100*a* includes a vehicle body 20 and a HUD 10*a* provided in the vehicle body 20. The vehicle body 20 includes an instrument panel 22 and a windshield 21. In FIG. 1, other components of the vehicle body 20 except the instrument panel 22 and the windshield 21 are omitted. The HUD 10*a* is a windshield-type HUD (WHUD), and the windshield 21 is a projection medium 30 of the vehicle 100*a*. The HUD 10*a* is in front of the instrument panel 22 and between the instrument panel 22 and the windshield 21.

In exemplary embodiments of the present disclosure, WHUD refers to a HUD that displays information within the driver's sight by using the windshield of the vehicle. Generally speaking, WHUD can be included in the vehicle. The term "transparent" means that a transmittance of light in a specific wavelength band (especially visible light and infrared light band) is high. For example, the transparent transmittance of light in a specific wavelength band in this disclosure is more than 70%, or even more than 80%.

The HUD 10*a* includes a housing 11, a picture generation unit (PGU) 13 and a reflection assembly 14. The housing 11 has an accommodating cavity 11*a*. The PGU 13 and the reflection assembly 14 are in the accommodating cavity 11*a*. The housing 11 further includes a light outlet 11*b* communicating with the accommodating cavity 11*a*. A transparent cover 12 is provided at the light outlet 11*b*. The transparent cover 12 is, for example, transparent glass. The transparent cover 12 includes a first surface 12*a* facing the accommodating cavity 11*a* and a second surface 12*b* opposite to the first surface 12*a*. The first surface 12*a* of the transparent cover 12 is provided with an optical film 15.

The PGU 13 is used to emit image light L1. The reflection assembly 14 is used for reflecting the image light L1 emitted by the PGU 13 to the light outlet 11*b*. The optical film 15 not only transmits image light L1 generated inside the HUD 10*a* but can reflect or absorb sunlight (ambient light L2) sourced outside the HUD 10*a*.

Since the optical film 15 can reflect or absorb external ambient light L2, the entry of sunlight is prevented into the HUD 10*a* is slowed down, and the service life of the HUD 10*a* is prolonged. In addition, since the ambient light L2 is absorbed or reflected by the optical film 15, heat caused by the external ambient light L2 is reduced, so that the HUD 10*a* dissipates heat faster. In addition, the image light L1 projected by the reflection assembly 14 can be transmitted through the optical film 15 and emitted to the projection medium 30 for imaging. Imaging of the HUD 10*a* is not affected by the optical film 15.

In some exemplary embodiments, the PGU 13 includes, for example, a light source (not shown) for generating light and a display element (not shown) for converting the light emitted from the light source into image light. The light source is, for example, a light emitting diode, an organic light emitting diode, or the like. The display element is, for example, a liquid crystal panel.

The reflection assembly 14 includes a first reflection mirror 141 and a second reflection mirror 142. The first reflection mirror 141 is located on a light-emitting side of the PGU 13 and is used for reflecting the image light L1 of the PGU 13 to the second reflection mirror 142. The second reflection mirror 142 is located on a side close to the light outlet 11*b* and is used for reflecting the image light L1 emitted by the first reflection mirror 141 towards the optical film 15. The image light L1 is transmitted through the optical film 15, enters the projection medium 30 (i.e., the windshield 21), and is plainly visible to the eyes of the driver 200.

Since the windshield 21 is in an inclined state, the image will be distorted. Therefore, at least one of the first reflection mirror 141 and the second reflection mirror 142 is a spherical mirror whose position is adjustable. In FIG. 1, the first reflection mirror 141 is a spherical mirror whose position is not adjustable, and the second reflection mirror 142 is a spherical mirror whose position is adjustable. By adjusting the position of the second reflection mirror 142, the position of the image on the projection medium 30 is adjusted, so that the image is clear and complete, and the driver 200 can clearly see it.

In some exemplary embodiments, the spherical mirror is, for example, a Freeform Concave Mirror, to magnify the image and provide a long imaging distance. In other embodiments, the reflection assembly 14 is not limited to include two reflection mirrors. For example, the reflection assembly 14 may include a third reflection mirror, a fourth reflection mirror, and the like.

In other exemplary embodiments, the first reflection mirror 141 may be a spherical mirror whose position is adjustable, and the second reflection mirror 142 may be a spherical mirror whose position is not adjustable, so that the image can be displayed clearly and completely.

Figure 2:
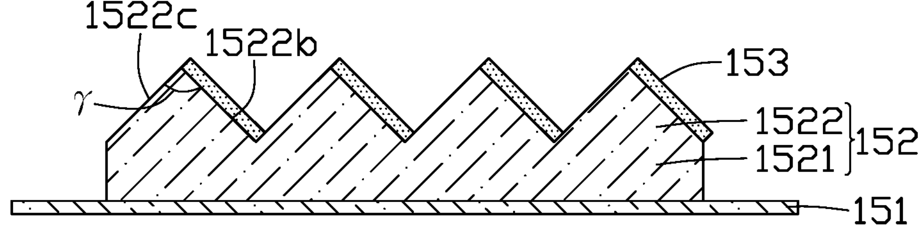
FIG. 2 is a cross-sectional view of an optical film in the HUD of FIG. 1.
Figure 3:
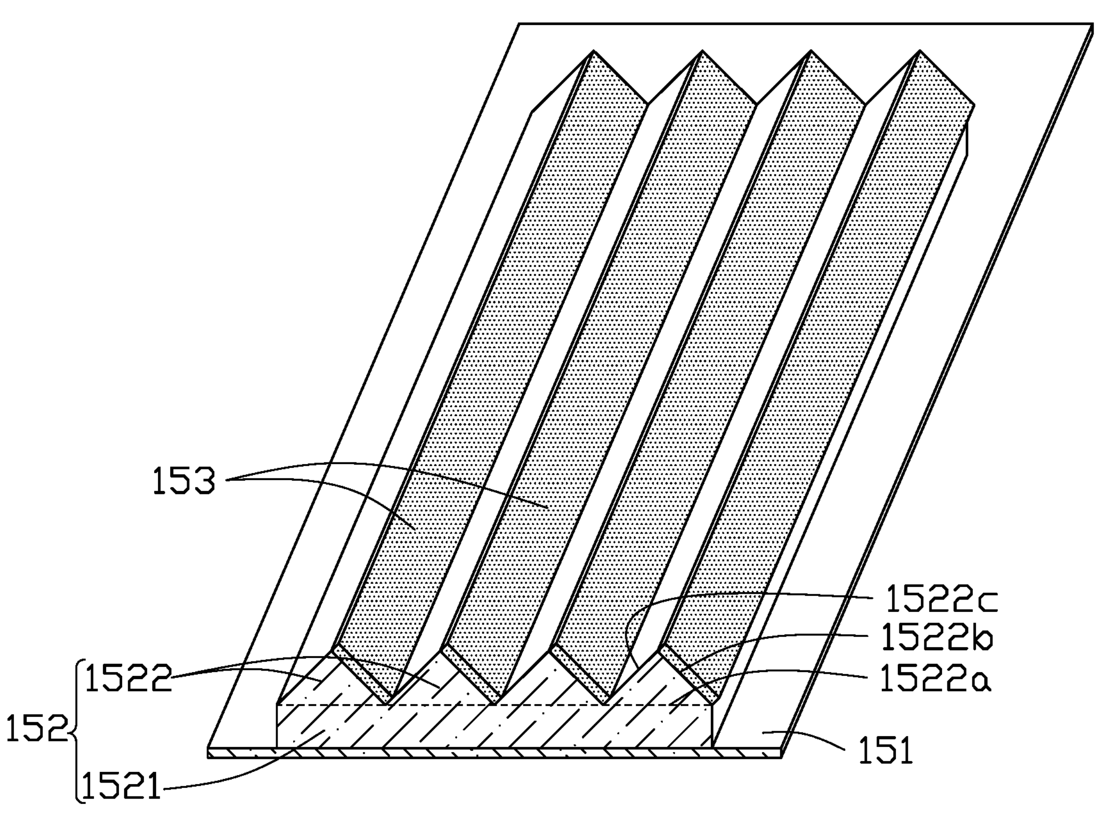
FIG. 3 is a schematic view of the optical film in FIG. 2.
Figure 3:
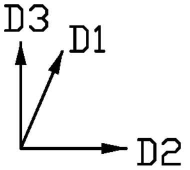

As shown in FIG. 2 and FIG. 3, four light blocking layers 153, each comprised of a protrusion 1522, are shown. In an actual structure of the optical film 15, the number of light blocking layers 153 is not limited.

As shown in FIG. 2, the optical film 15 includes a substrate 151, a microstructure layer 152 on the substrate 151, and the light blocking layers 153 on a side of the microstructure layer 152 away from the substrate 151. In a cross section across its length, the protrusion 1522 is in the form of a sawtooth. Each light blocking layer 153 corresponds to one protrusion 1522 and one surface of the sawtooth-shaped protrusion 1522 is covered by the light-blocking layer 153.

Both the substrate 151 and the microstructure layer 152 are transparent, so that the image light L1 can pass through. A material of the substrate 151 is, for example, polyethylene terephthalate (PET), polycarbonate (PC), polymeric methyl methacrylate (PMMA), colorless polyimide (CPI), cycloolefin copolymer (COC) or other optical transparent polymer materials. A material of the microstructure layer 152 is, for example, a thermal curing material or an ultraviolet curing material. For example, the material of the microstructure layer 152 is acrylic, silicon type curing material, or organic and inorganic mixed material (e.g., acrylic and silicone copolymer, namely Acrylic & SiO-copolymer).

Each light blocking layer 153 includes an absorbing film that absorbs light or a reflective film that reflects light. In the case where the light blocking layer 153 has an absorbing film, the ambient light L2 incident on the absorbing film is at least partially absorbed and attenuated. In the case where the light blocking layer 153 includes a reflective film, the ambient light L2 incident to the reflective film is at least partially reflected. A material of the absorbing film includes, for example, an ultraviolet absorber or a polarizing material, so as to absorb the external ambient light L2. A material of the reflective film includes, for example, metal particles or oxide particles. The metal particles are, for example, simple elements such as aluminum (Al), silver (Ag), copper (Cu), molybdenum (Mo), chromium (Cr), titanium (Ti), nickel (Ni), tungsten (W), iron (Fe), or alloys containing one or more of the above elements. The oxide particles are, for example, oxides of elements such as titanium (Ti) and silicon (Si), or combinations thereof.

The materials of the absorbing film and the reflection film are not limited to the above-materials. The material of the absorbing film may be a material that can absorb the ambient light L2 in a specific wavelength band, and the material of the reflective film may be a material that can reflect the ambient light L2 in a specific wavelength band. In addition, in the optical film 15, all the light blocking layers 153 may be absorbing films or reflective films, so as to simplify the manufacturing process, not being limited thereto. That is, in the optical film 15, some light blocking layers 153 may be absorbing films and other light blocking layers 153 are reflecting films.

As shown in FIG. 3, the substrate 151 is substantially rectangular and is flat and thin. In other embodiments, the shape of the substrate 151 is not particularly limited, and it can be configured according to the shape and size of the transparent cover 12. For example, the substrate 151 can be configured to have a curved surface and match the size of the transparent cover 12.

The microstructure layer 152 includes a base portion 1521 in direct contact with the surface of the substrate 151 and a plurality of protrusions 1522 protruding from the base portion 1521 toward a side away from the substrate 151 (i.e., the third direction D3). The base portion 1521 supports the protrusion 1522. The base portion 1521 and the protrusions 1522 are integrally formed. That is, there is no boundary between the base portion 1521 and the protrusions 1522. Compared with the protrusions directly formed on the substrate, the base portion 1521 of the microstructure layer 152 can improve the strength of the protrusions 1522, thereby improving the durability of the microstructure layer 152. Furthermore, since the entire surface of the base portion 1521 is in close contact with the substrate 151, the resistance of the microstructure layer 152 against peeling can be improved.

Each protrusion 1522 extends along a first direction D1. The plurality of protrusions 1522 are distributed continuously and without intervals and breaks along a second direction D2 intersecting with the first direction D1. The first direction D1, the second direction D2 and the third direction D3 are perpendicular to each other, forming a rectangular coordinate system. The base portion 1521 is substantially rectangular. Each protrusion 1522 is a triangular prism. Each protrusion 1522 includes a first side surface 1522*a*, a second side surface 1522*b*, and a third side surface 1522*c* which are connected in sequence. Each of the first side surface 1522*a*, the second side surface 1522*b*, and the third side surface 1522*c* is a quadrilateral. The first side surface 1522*a* is in direct contact with the base portion 1521, the corresponding one of the light blocking layers 153 covers the second side surface 1522*b*, and the third side surface 1522*c* is transparent and allows light to pass through. It should be noted that the first side surface 1522*a* in FIG. 3 is a notional plane (shown by a dotted line), rather than a real interface. Each light blocking layer 153 completely covers the second side surface 1522*b* of a corresponding one of protrusions 1522. In other exemplary embodiments, the light blocking layer 153 may partially cover the second side surface 1522*b* of the corresponding one of protrusions 1522.

As shown in FIG. 1, the surface of the substrate 151 without the microstructure layer 152 is combined with the transparent cover 12 (e.g., attached by transparent glue). When sunlight shines on the vehicle 100*a*, the ambient light L2 is incident on the light blocking layers 153 through the windshield 21 (i.e., the projection medium 30), and is reflected or absorbed by the light blocking layers 153 and cannot enter the inside of the housing 11, which prevents the sunlight from entering the inside of the housing 11. Sunlight being prevented from entering the inside of the housing 11 and thus not being reflected to the PGU 13 by the reflecting assembly 14 removes the effect of heat on the PGU 13. The image light L1 reflected by the reflection assembly 14 is sequentially transmitted to the projection medium 30 through the transparent cover 12, the substrate 151, and the position where the protrusions 1522 are not provided, to form an image. The image light L1 reflected by the projection medium 30 forms an image before the eyes of the driver 200 and is observed by the driver 200.

In some embodiments, after the optical film 15 is attached to the transparent cover 12, the transparent cover 12 and the housing 11 are assembled. In other embodiments, after the transparent cover 12 and the housing 11 are assembled, the optical film 15 is attached to the transparent cover 12. That is, the manufacturing process is flexible.

As shown in FIG. 1, an angle between the ambient light L2 incident on the optical film 15 and the second side surface 1522*b* is defined as a first angle α, and an angle between the image light L1 incident on the optical film 15 and the third side surface 1522*c* is defined as a second angle β. In some embodiments, the first angle α ranges from 5° to 150° (e.g., 5° to 20°, 20° to 40°, 40° to 60°, 60° to 90°, 90° to 120°, 120° to 150°), so that most of the ambient light L2 incident on the optical film 15 is blocked. The second angle θ is in the range of 5° to 150° (e.g., 5° to 30°, 30° to 50°, 50° to 70°, 70° to 90°, 90° to 120°, 120° to 150°), so that most of the image light L1 incident on the optical film 15 can be transmitted.

As shown in FIG. 2, an angle between the second side surface 1522*b* and the third side surface 1522*c* is defined as a third angle γ. In some embodiments, the third angle γ ranges from 30° to 150° (e.g., 30° to 50°, 50° to 70°, 70° to 90°, 90° to 120°, 120° to 150°). When the third angle γ is within the above range, it can be ensured that the light output of the image light L1 inside the HUD is not disturbed when the amount of the ambient light L2 is reduced.

In other embodiments, the shape of each protrusion 1522 is not limited, as long as it can allow transmission of the image light L1 and reflect or absorb the external ambient light L2. For example, in a cross section across their length, the protrusions 1522 may be rectangular, trapezoidal, elliptical, semicircular, or the like. It should be noted that the cross section of each protrusion 1522 is a triangle, rectangular, trapezoidal, elliptical, semicircular, etc., which is beneficial for mold-release when the microstructure layer 152 is formed by nano imprint. Furthermore, each protrusion 1522 is a triangular prism, and the second side surface 1522*b* and the third side surface 1522*c* are flat surfaces, which can prevent curved surfaces refracting the image light L1 and adversely affecting the imaging quality of the HUD.

In other embodiments, the protrusions 1522 and the base portion 1521 may be non-integrated. That is, the base portion 1521 and the protrusions 1522 may be respectively formed on the substrate 151. When the protrusions 1522 and the base portion 1521 are integrally formed, on the one hand, the manufacturing process can be simplified, and on the other hand, there is no obvious interface between the protrusions 1522 and the base portion 1521, which will not affect the optical path.

In other embodiments, the optical film 15 further includes a protective film (not shown) covering at least one surface of the light blocking layer 153, so as to improve the scratch resistance, stain resistance, and water resistance of the optical film 15. The protective film may also cover the entire outer surface of the optical film 15.

Figure 4:
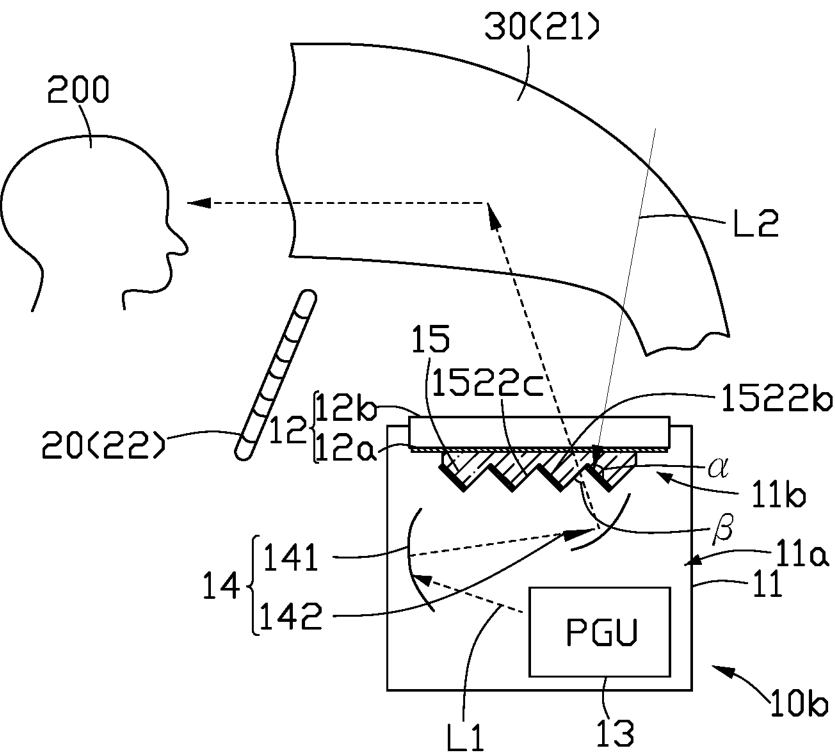
FIG. 4 is a schematic diagram of a vehicle with HUD according to another embodiment of the present disclosure.

FIG. 4 is a schematic diagram of a vehicle according to another embodiment. As shown in FIG. 4, the difference between the vehicle 100*b* and the vehicle 100*a* in FIG. 1 is that in the HUD 10*b*, the optical film 15 is disposed on the second surface 12 *b* of the transparent cover 12. The surface of the substrate 151 of the optical film 15 without the microstructure layer 152 is attached to the transparent cover 12 (e.g., attached by transparent glue). When the vehicle 100*b* is in sunlight, the external ambient light L2 passes through the transparent cover 12, the base portion 1521, and the protrusions 1522, then is transmitted on the light blocking layers 153. It is absorbed or reflected at the light blocking layer 153 and cannot enter the interior of the housing 11. Therefore, the influence of the ambient light L2 on the PGU 13 after entering the interior of the HUD 10*b* is avoided. The image light L1 reflected by the reflection assembly 14 is directly transmitted through the transparent cover 12 and through the surface of the protrusions 1522 without the light blocking layers 153 and the base portion 1521, and is further incident on the projection medium 30 to form an image. The image light L1 enters the eyes of the driver 200 and is observed by the driver 200.

In some embodiments, after the optical film 15 is attached to the transparent cover 12, the transparent cover 12 and the housing 11 are assembled together. By adjusting the position of the adjustable mirror in the reflection assembly 14, the angle at which the image light L1 is incident on the optical film 15 is adjusted, so that the image projected on the projection medium 30 is clear and complete.

Figure 5:
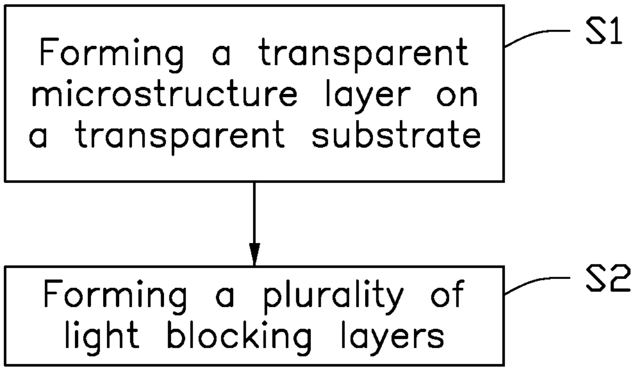
FIG. 5 is a schematic flowchart of a method of making an optical film according to an embodiment of the present disclosure.

A method of making an optical film is disclosed. The method is provided by way of embodiment, as there are a variety of ways to carry out the method. The method described below can be carried out using the configurations illustrated in FIG. 5 and FIG. 6 for example, and various elements of these figures are referenced in explaining the method. Each block in this method represents one or more processes, methods, or subroutines, carried out in the method. Additionally, the illustrated order of blocks is by example only and the order of the blocks can change. The method can begin at Block S1.

In Block S1, a transparent microstructure layer is formed on a transparent substrate.

Figure 6:
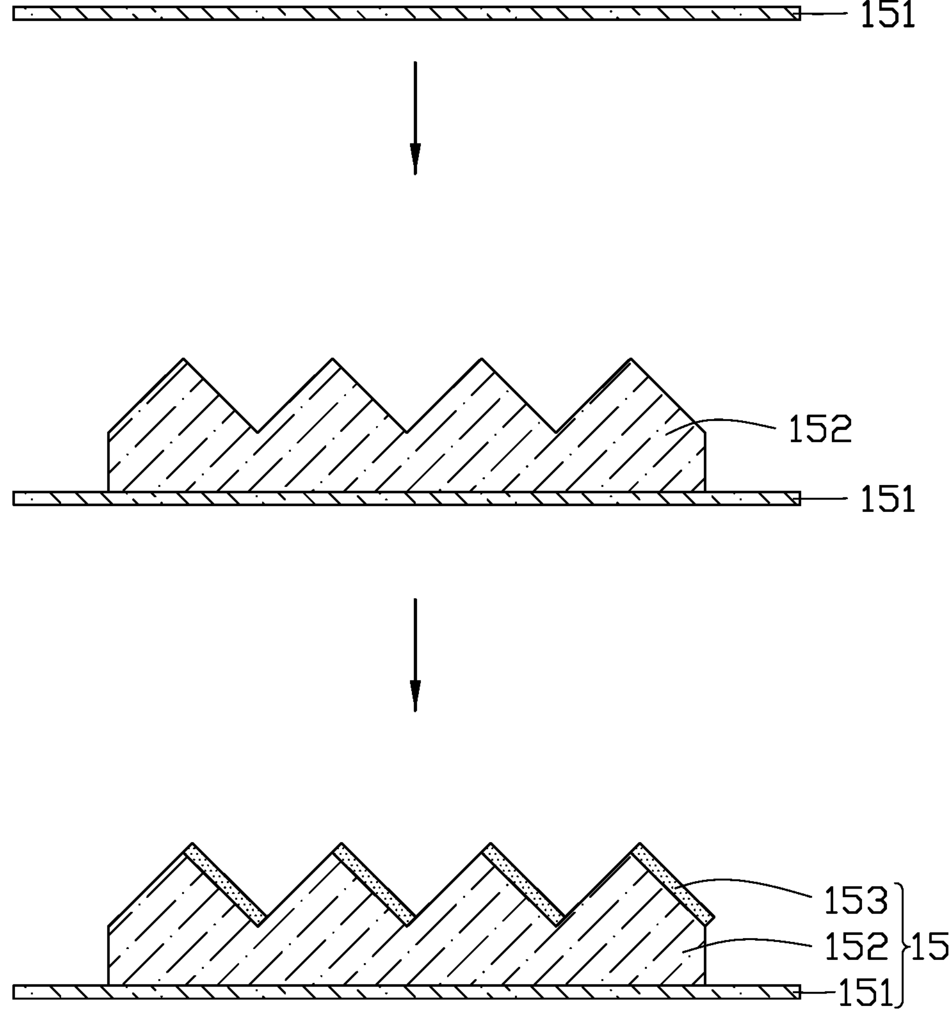
FIG. 6 illustrates cross-sectional views of the optical film at different manufacturing phases according to the method in FIG. 5.

In some embodiments, the microstructure layer 152 is formed on the substrate 151 shown in FIG. 6 by a process of laser processing, of photolithography, or of nano imprint.

In one embodiment, the step of forming the microstructure layer 152 by laser processing includes, for example, forming a material layer of a microstructure layer on the substrate 151, and then processing the material layer with a laser, so that part of the material layer is removed, and part of the material layer is left, thereby obtaining the microstructure layer 152. The step of forming the microstructure layer 152 by laser processing is simple.

In one embodiment, the step of forming the microstructure layer 152 by photolithography, for example, includes forming a patterned photoresist layer on a material layer on which the microstructure layer is to be formed, and the material layer is shaped by the patterned photoresist layer to form a concave-convex structure to obtain the microstructure layer 152. This method involves lithography equipment and the like, the cost is relatively high.

In one embodiment, the step of forming the microstructure layer 152 by nano imprint includes, for example, coating a material layer for forming the microstructure layer on the substrate 151, then applying a mold with a concave-convex structure on the material layer, irradiating ultraviolet rays or heating to cure the material layer, demolding and transferring to form the microstructure layer 152 having a base portion and protrusions. Forming the microstructure layer 152 by nano imprint technology has the advantage of reducing production cost and complexity compared to photolithography technology.

In addition, in block S1, the microstructure layer 152 is directly formed on the substrate 151 instead of being adhered to the substrate 151 by adhesive. Since adhesive has poor heat resistance and heat dissipation, the optical film 15 has better heat dissipation and heat resistance. In addition, the microstructure layer 152 is directly formed on the substrate 151 without adhesive, which can reduce the thickness of the optical film 15, reduce the cost and avoid the influence of the adhesive on the refraction of the optical path.

In block S2, a plurality of light blocking layers is formed.

In some embodiments, the light blocking layers 153 are formed on the microstructure layer 152 of FIG. 6 by one of coating, vapor deposition, spraying or sputtering. Coating, vapor deposition, spraying or sputtering of the light blocking layers 153 can be performed from a source which is inclined. In the above manner, the specific shape of the light blocking layer 153 can be regulated by changing the film-forming conditions, film-forming materials, and the like.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. An optical film, comprising:

a transparent substrate;

a transparent microstructure layer on the transparent substrate, the microstructure layer comprising a base portion having a predetermined thickness and in direct contact with a surface of the transparent substrate and a plurality of protrusions protruding from the base portion toward a side away from the transparent substrate; and a plurality of light blocking layers, wherein each of the plurality of light blocking layers partially covers a corresponding one of the plurality of protrusions, and each of the plurality of light blocking layers comprises an absorbing film configured for absorbing light or a reflective film configured for reflecting light; each of the plurality of protrusions extends in a strip shape along a first direction, and the plurality of protrusions are distributed continuously along a second direction intersecting with the first direction; each of the protrusions is a triangular prism, and the triangular prism comprises a first side surface, a second side surface and a third side surface which are connected in sequence; each of the first, the second and the third side surfaces is a quadrilateral; the first side surface is in direct contact with the base portion, the corresponding one of the plurality of light blocking layers covers the second side surface, and the third side surface of the triangular prism is exposed.

2. The optical film of claim 1, wherein an angle between the second side surface and the third side surface ranges from 30° to 150°.

3. A head up display (HUD), comprising:

a housing comprising an accommodating cavity and a light outlet formed in a wall of the housing and providing a light path from the accommodating cavity to an exterior of the housing;

a transparent cover mounted on the housing and located at the light outlet;

a picture generation unit in the accommodating cavity for emitting image light;

a reflection assembly in the accommodating cavity, the reflection assembly being configured for reflecting the image light from the picture generation unit to the light outlet; and an optical film on the transparent cover, the optical film comprising:

a transparent substrate;

a transparent microstructure layer on the transparent substrate, the microstructure layer comprising a base portion having a predetermined thickness and in direct contact with a surface of the transparent substrate and a plurality of protrusions protruding from the base portion toward a side away from the transparent substrate; and a plurality of light blocking layers, wherein each of the plurality of light blocking layers partially covers a corresponding one of the plurality of protrusions, and each of the plurality of light blocking layers comprises an absorbing film configured for absorbing light or a reflective film configured for reflecting light;

wherein the image light reflected by the reflection assembly is emitted from the optical film to a projection medium for imaging; each of the plurality of protrusions extends in a strip shape along a first direction, and the plurality of protrusions are distributed continuously along a second direction intersecting with the first direction; each of the protrusions is a triangular prism, and the triangular prism comprises a first side surface, a second side surface and a third side surface which are connected in sequence; each of the first, the second and the third side surfaces is a quadrilateral; the first side surface is in direct contact with the base portion, the corresponding one of the plurality of light blocking layers covers the second side surface, and the third side surface of the triangular prism is exposed.

4. The HUD of claim 3, wherein an angle between the second side surface and the third side surface ranges from 30° to 150°.

5. The HUD of claim 3, wherein the optical film is positioned such that an angle between the image light incident on the optical film and the third side surface ranges from 5° to 150°.

6. The HUD of claim 3, wherein the optical film is positioned such that an angle of ambient light incident on the optical film and the second side surface ranges from 5° to 150°.

7. A vehicle, comprising:

a windshield; and a head up display (HUD), comprising:

a housing comprising an accommodating cavity and a light outlet formed in a wall of the housing and providing a light path from the accommodating cavity to an exterior of the housing;

a transparent cover mounted on the housing and located at the light outlet;

a picture generation unit in the accommodating cavity for emitting image light;

a reflection assembly in the accommodating cavity, the reflection assembly being configured for reflecting the image light from the picture generation unit to the light outlet; and an optical film on the transparent cover, the optical film comprising:

a transparent substrate;

a transparent microstructure layer on the transparent substrate, the microstructure layer comprising a base portion having a predetermined thickness and in direct contact with a surface of the transparent substrate and a plurality of protrusions protruding from the base portion toward a side away from the transparent substrate; and a plurality of light blocking layers, wherein each of the plurality of light blocking layers partially covers a corresponding one of the plurality of protrusions, and each of the plurality of light blocking layers comprises one of an absorbing film configured for absorbing light and a reflective film configured for reflecting light;

wherein the image light reflected by the reflection assembly is emitted from the optical film to the windshield for imaging; the transparent cover comprises a first surface and a second surface opposite to the first surface, the first surface faces the accommodating cavity, and the optical film is on one of the first surface and the second surface;

each of the plurality of protrusions extends in a strip shape along a first direction, and the plurality of protrusions are distributed continuously along a second direction intersecting with the first direction; each of the protrusions is a triangular prism, and the triangular prism comprises a first side surface, a second side surface and a third side surface which are connected in sequence; each of the first, the second and the third side surfaces is a quadrilateral; the first side surface is in direct contact with the base portion, the corresponding one of the plurality of light blocking layers covers the second side surface, and the third side surface of the triangular prism is exposed.

* * * * *